United States Patent Office 3,767,765
Patented Oct. 23, 1973

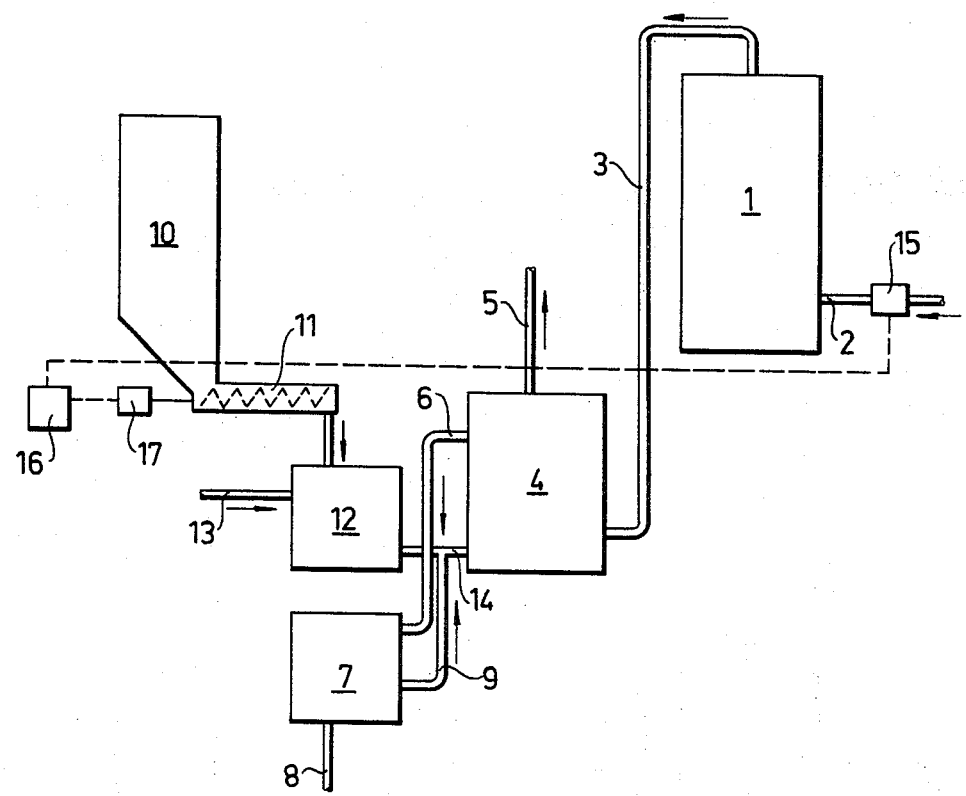

3,767,765
METHOD AND APPARATUS FOR CLEANSING FLUE GAS
Karl-Axel Göran Gustavsson and Jan Karl Lennart Smitt, Enkoping, Sweden, assignors to Aktiebolaget Bahco, Stockholm, Sweden
Continuation of application Ser. No. 749,546, Aug. 1, 1968. This application Dec. 11, 1970, Ser. No. 97,337
Claims priority, application Sweden, Oct. 17, 1967, 14,224/67
Int. Cl. B01d 53/34
U.S. Cl. 423—220       1 Claim

ABSTRACT OF THE DISCLOSURE

A method and apparatus for cleansing flue gas from a furnace, according to which the flue gas is absorbed in an alkaline absorption liquid comprising water to which the alkali is supplied at a controlled rate in response to the rate of fuel supply to the furnace.

---

This application is a continuation of our application, Ser. No. 749,546, filed Aug. 1, 1968, now abandoned.

The present invention is concerned with a method and an apparatus for cleansing flue gases of different impurities, primarily of sulphur dioxide and secondarily of solid products of combustion, such as soot, coke dust and ash.

The discharge of flue gases from heating and firing installations, e.g. oil firing and heating plants, has given rise to an ever increasing problem, mainly due to the amounts of sulphur and soot which contaminate the air as a result thereof. Consequently, it is becoming more and more urgent to find ways and means for removing said impurities from the flue gases in an economic manner, to prevent the damage which such impurities cause in the form of corrosion, poisoning of vegetation, smog formation etc. From the point of view of economy the discharge of $SO_2$ would seem to be the most deleterious, owing to the damage resulting from the corrosion caused by the sulphur dioxide.

An expedient method of removing the sulphur impurities is based upon the known fact that sulphur dioxide is readily absorbed in alkaline aqueous solutions. It has been shown that excellent separation of sulphur dioxide can be achieved by absorption in an alkaline aqueous solution, provided that the process is effected so that a sufficient contact surface is obtained between the alkaline treatment agent and the sulphur dioxide bearing flue gas, and that sufficient contact time is provided, so that the degree of absorption is practically one hundred percent. A wide contact surface is obtained if the alkaline treatment liquid is broken down into small droplets. Nozzles which work under pressure can be used for this purpose, or preferably an arrangement in which the liquid is atomized by causing the gas to attack the surface of the treatment liquid at high speed, and then entrain the droplets of liquid up through a vertical treatment passage, in which the absorption process is effected. The requirement of sufficient contact time can easily be fulfilled in an apparatus of the latter type by reducing the velocity of the gas during its flow upwards through the treatment passage, which for this purpose is designed as a diffuser. In such an apparatus it is possible to achieve a sulphur dioxide absorption of the order of 95–100%, which also varies only slightly with varying amounts of gas supplied to the apparatus per unit time.

Subsequent to the gas and absorption liquid having been brought into contact in this or some other manner for a sufficient length of time to enable complete absorption of the sulphur dioxide the liquid droplets are separated from the gas and returned to the absorption system, to be brought into contact with fresh quantities of gas. A part of the liquid is led away for sludge separation, and an amount of liquid corresponding to the amount of liquid carried away with the sludge and to liquid losses is supplied to the system together with alkali to replace alkali losses.

Among the alkalis which can be used as treatment or absorption agents in apparatus of the type mentioned or other apparatus for absorption of sulphur dioxide from flue gases, are primarily sodium hydroxide (caustic soda) and calcium hydroxide (hydrated lime). Caustic soda is naturally a better absorption agent but because it is too expensive, aqueous calcium hydroxide is usually used.

The hydrated lime may conveniently be metered in powder form direct to a dissolver by means of a screw conveyor or some other mechanical means, whereafter the solution is passed to the absorption apparatus proper. Metering of the lime or some similar alkaline substance may in accordance with known methods, be controlled by instruments for regulating the pH value of the absorption liquid, so that an alkalinity of pH 7–11 is maintained. This method of controlling the amount of alkali supplied to the system, however, involves a high cost for the instruments required.

It has been found that a more simple way of controlling the metering is to control the amount of alkali charged in direct connection with the amount of fuel used in the furnace from which the flue gases are obtained, so that the supply of alkali is increased when the fuel consumption increases. It would be presumed that a control of this nature would result in an unsatisfactory pH control in the absorption apparatus since an excessive or insufficient alkali supply would tend to cause a constant raising or lowering of the pH value. It has been found, that the buffer effect of the carbonate formed by the carbon dioxide content of the fumes is so strong that the pH of the absorption solution remains practically constant at a predetermined level if alkali is charged in quantities proportionate with the amount of fuel consumed.

The invention will now be described in detail with reference to the accompanying drawing, which shows diagrammatically an embodiment of the apparatus.

Shown in the drawing is a heating system 1 fired with sulphur-bearing fuel, such as oil, supplied through conduit 2. The flue gases pass via line 3, as indicated, to an absorption apparatus 4 in which they are brought into contact with an alkali treatment liquid for absorbing the sulphur dioxide, and, at the same time, soot etc. The cleansed gas then departs through the line 5. A certain amount of absorption liquid is removed, continuously or intermittently, through a line 6 and passed to a settling tank 7, from which sludge is removed through a line 8 and the water freed from sludge is returned to the system via a line 9.

The absorption liquid comprises aqueous calcium hydroxide. A lime storage container is shown at 10, from which the lime is discharged by means of a suitable conveyor, e.g. a screw conveyor 11, down into a dissolver 12 into which water is charged through a line 13 in an amount corresponding to that which leaves the system with the sludge through the line 8. The resulting lime solution is passed to the absorption apparatus 4 through a line 14.

A gauge means 15 is placed in the oil conduit 2 and sends signals to a regulator 16, which controls the motor 17 of the screw conveyor so that lime is charged proportionate to the fuel consumption of the furnace 1.

The apparatus should preferably be provided with means (e.g. manually operable) for adjusting the supply of lime as a function of the contents of sulphur of the oil to adjust the system to oils of varying sulphur content.

It is to be noted that the sysem functions most satisfactorily in connection with an absorbing apparatus which operates with a high and substantially constant absorption of sulphur dioxide, such as that referred to above. In such an apparatus the consumption of lime is very closely proportionate to the amount of sulphur dioxide in the gas, which in turn is proportionate to the amount of sulphur in the oil.

We claim:

1. A process of removing sulfur dioxide and carbon dioxide from a flue gas from a furnace burning a sulfur-containing fuel, said process comprising passing said flue gas through an absorption zone in contact with a recirculating alkaline absorption liquid comprising water and an alkali, whereby said sulfur dioxide and carbon dioxide are absorbed in said alkaline absorption liquid, introducing alkali directly into said recirculating absorption liquid independently of the rate of flow of said flue gas to compensate for alkali consumed by the absorption of sulfur dioxide, maintaining the alkalinity of said absorption liquid substantially constant by measuring the rate of fuel supply to the furnace and regulating the rate of alkali supply to said recirculating absorption liquid in response to the rate of fuel supply so that the rate of alkali supply is substantially proportional to the rate of fuel supply.

References Cited

UNITED STATES PATENTS

| | | | |
|---|---|---|---|
| 2,021,936 | 11/1935 | Johnstone | 23—2 SQ |
| 2,113,198 | 4/1938 | Nonhebel et al. | 23—2 SQ |
| 3,320,906 | 5/1967 | Domahidy | 110—1 |
| 3,411,864 | 11/1968 | Pallinger | 23—2 R |

OTHER REFERENCES

Ardern et al., "The Treatment of Flue Gases," Report of the Advisors to the London Power Company, Ministry of Transport, London, 1929, 10 pages, pp. 1-3 relied upon.

EARL C. THOMAS, Primary Examiner

U.S. Cl. X.R.

423—234, 242; 110—15; 431—12